United States Patent Office 2,983,773
Patented May 9, 1961

---

2,983,773

TREATMENT OF AN ALKYLATE TO IMPROVE THE OCTANE NUMBER

Wiley P. Ballard, Port Arthur, Tex., and Samuel P. Dickens and John K. McKinley, Poughkeepsie, N.Y., assignors to Texaco Inc., a corporation of Delaware No Drawing. Filed May 14, 1957, Ser. No. 658,941

9 Claims. (Cl. 260—683.62)

This invention relates to the treatment of hydrocarbons, and more particularly to the production of high octane motor fuel.

Currently, various processes such as the catalytic cracking of heavy distillates, the reforming of naphtha fractions, the polymerization of low molecular weight olefins and the alkylation of parafins with olefins are used for the production of motor fuel. This invention is concerned particularly with the treatment of alkylate gasoline.

In the production of alkylate gasoline an isoparafin, usually isobutane is alkylated with olefins. In commercial practice, these are usually the olefins contained in the butane fraction from a cracking unit but propylenes and pentylenes are frequently used. The reaction takes place in the presence of a catalyst such as sulfuric acid, hydrofluoric acid, a boron fluoride-water complex, an aluminum halide with a hydrogen halide promoter or an aluminum halide-hydrocarbon complex. It is customary in the alkylation process to contact the mixture of olefin and isoparaffin with the catalyst under such conditions that alkylation of the isoparaffin with the olefin occurs to produce branch chain saturated hydrocarbons. To minimize polymerization of the olefins the reaction is carried out at low temperatures in the presence of a large excess of the isoparaffins. The resulting alkylate consists largely of isoparaffins having 7, 8 or 9 carbon atoms depending on the composition of feed. A typical alkylate gasoline has an ASTM research octane number of 90–93 and has a leaded ASTM research octane number of 100–103. It generally contains 97–99% isoparaffins which are distributed in approximately the following proportions:

| | Percent |
|---|---|
| 2,3-dimethyl pentane | 5.0 |
| 2,2- / 2,4- } dimethyl pentane | 4.8 |
| 3,3- / 2,3- } dimethyl pentane | 5.8 |
| 2,2,4-trimethyl pentane | 31.2 |
| Dimethyl hexane | 3.7 |
| 2,3,3- / 2,3,4- } trimethyl pentane | 35.1 |
| Isononanes | 4.2 |
| Isodecanes and heavier | 10.2 |

Alkylate gasoline has several advantages over gasolines prepared by other methods, particularly its low vapor pressure, its substantial freedom from gum forming constituents, and, because it consists almost entirely of isoparaffins, its high octane number and its high tetraethyl lead response. It is customary for leaded alkylate (containing 3 cc. TEL per gallon) to have an ASTM research octane number slightly in excess of 100.

It is an object of this invention to provide a method for increasing the octane number of alkylate gasoline.

According to the method of the present invention, the octane number of alkylate gasoline is increased by subjecting the alkylate to dehydrogenation conditions in the presence of a dehydrogenation catalyst. Any suitable catalyst having dehydrogenation properties such as cobalt, iron, nickel or platinum deposited on a carrier or the oxides, sulfides or suitable salts of chromium, molybdenum, cobalt, nickel, zinc, iron, vanadium or mixtures thereof, alone or deposited on carriers such as alumina, magnesia, zirconia, silica-alumina mixtures and the like may be used.

The dehydrogenation conditions will vary depending upon the catalyst used. However, a suggested temperature range is about 700–1200° F. with temperatures from between about 750–950° F. being preferred. The liquid hourly space velocity, that is, the weight of fluid per hour per weight of catalyst may range from 0.1 to 5. Space velocities of 0.5 to 2 are preferred. With higher temperatures it is desirable to use higher space velocities and with lower temperatures, lower space velocities are preferred. Pressures may range from sub-atmospheric to about 1000 p.s.i.g. The catalyst may be either in the form of a fixed bed or in the form of a fluidized bed.

EXAMPLE I

In this example, an alkylate containing 98.6 volume percent paraffins, 1.3 volume percent naphthenes and 0.1 volume percent aromatics was passed through a fluidized bed of chromia-alumina catalyst, containing 20 percent $CR_2O_3$ by weight, under the following conditions:

*Table 1*

| | |
|---|---|
| Temperature, ° F. | 864 |
| Pressure (inches $H_2O$) | 1.3 |
| Space velocity, wt./hr./wt. | 0.92 |
| Catalyst/oil ratio | 7.44 |

A total liquid yield of 96.64 percent by weight was obtained. A comparison of the charge and product is shown below.

*Table 2*

| | Charge | Product |
|---|---|---|
| ASTM Research Octane No.: | | |
| Clear | 93.4 | 97.9 |
| +3 cc. TEL per gallon | [1]101.92 | [1]108.47 |
| Gravity, ° API | 71.7 | 70.2 |
| Bromine No. | 1 | 11 |
| ASTM Distillation, ° F.: | | |
| IBP | 108 | 118 |
| 10 | 164 | 170 |
| 50 | 220 | 221 |
| 90 | 255 | 256 |
| EP | 344 | 350 |

[1] Wiese scale

A hydrocarbon type analysis showed that the product was composed of 3.8% aromatics, 7.7% olefins, 86.0 paraffins and 2.5% naphthenes.

EXAMPLE II

In this example the catalyst was composed of a mixture of 50 parts chromia-alumina and 50 parts zinc oxide-zinc chromite catalyst.

The zinc oxide-zinc chromite catalyst was prepared in the following manner. 3036 grams of C.P. ammonium dichromate were dissolved in 10 liters of water. When solution was complete 2400 ml. concentrated ammonium hydroxide in 4 liters of water was added. A separate solution of 7134 grams of CP $Zn(NO_3)_2.6H_2O$ in 16 liters of water was prepared. The solutions were then mixed by being added slowly and simultaneously at equal rates with good agitation to a vessel containing 4 liters of water. Stirring was continued for one half hour after the addition was complete. To insure complete precipitation 600 ml. concentrated ammonium hydroxide was then added. The precipitate was filtered and washed three times with 10 liters of water, dried and the resulting powder decomposed in small portions by heating to the incipient decomposition temperature which was found to be about 640° F. The decomposed powder was then ground to a particle size of less than 200 microns in diameter with the major proportion being between 20 and 80 microns.

The powder contained 26% ZnO and 74% $ZnCr_2O_4$. Catalysts of varying compositions may be prepared by using the appropriate amounts of starting materials. Compositions containing from 25–75% ZnO and 75–25% $ZnCr_2O_4$ are satisfactory for dehydrogenation purposes.

The charge stock to the mixed chromia-alumina zinc oxide-zinc chromite catalyst, which was maintained in a fluidized state, was an alkylate containing 97.6 volume percent paraffins and 2.4 volume percent naphthenes.

The following table shows the operating conditions and a comparison of the charge stock and treated alkylate.

Table 3

| Run No. | Charge Stock | 1 | 2 |
|---|---|---|---|
| Average Temp., ° F. | | 896 | 920 |
| Space Velocity, wt. per hr. per wt. | | 0.67 | 0.67 |
| Catalyst/oil ratio | | 45 | 45 |
| Gravity, ° API | 71.2 | 65.9 | 65.7 |
| Bromine No. | 1 | 16 | 16 |
| ASTM Distillation, ° F.: | | | |
| IBP | 116 | 163 | 159 |
| 10 | 166 | 204 | 199 |
| 50 | 217 | 226 | 224 |
| 90 | 252 | 262 | 262 |
| EP | 338 | 364 | 358 |
| ASTM Research Octanes: | | | |
| Clear | 93.4 | 98.5 | 99.2 |
| +3 cc. TEL per gallon | [1] 103.11 | [1] 108.13 | [1] 109.11 |
| Hydrocarbon Type Analysis, Vol. Percent: | | | |
| Aromatics | 0.0 | 7.4 | 7.4 |
| Olefins | 0.0 | 7.5 | 8.9 |
| Paraffins | 97.6 | 84.6 | 83.1 |
| Naphthenes | 2.4 | 0.5 | 0.6 |

[1] Wiese scale.

EXAMPLE III

With the same alkylate charge as in Example I but using a fixed bed of the chromia-alumina catalyst, the operating conditions and results are set forth below:

Table 4

| Run No. | Charge Stock | 1 | 2 |
|---|---|---|---|
| Average Temp., °F. | | 824 | 915 |
| Space velocity, wt./hr./wt. | | 0.75 | 0.75 |
| ASTM Research Octane No.: | | | |
| Clear | 93.4 | 98.1 | 99.3 |
| +3 cc. TEL/gallon | [1] 101.92 | [1] 108.07 | [1] 109.21 |

[1] Wiese scale.

EXAMPLE IV

With a fluidized molybdenum sulfide-alumina catalyst (containing 7.5% molybdenum and 6.5% sulfur by weight), the following table shows the reaction conditions and a comparison between the charge and product.

Table 5

| | Charge | Product |
|---|---|---|
| Average Temp., ° F. | | 865 |
| Pressure (inches $H_2O$) | | 2.5 |
| Space velocity, wt./hr./wt. | | 0.45 |
| Catalyst/oil ratio | | 15 |
| Gravity, ° API | 71.5 | 67.6 |
| Bromine No. | 1.0 | 23 |
| ASTM Research Octane No.: | | |
| Clear | 93.2 | 99.0 |
| +3 cc. TEL per gallon | [1] 102.14 | [1] 108.69 |
| Liquid yield, vol. percent | | 91.1 |
| ASTM Distillation Range: | | |
| IBP | 110 | 116 |
| 10 | 165 | 173 |
| 50 | 221 | 225 |
| 90 | 257 | 268 |
| EP | 345 | 364 |
| Hydrocarbon Type Analysis, Vol. Percent: | | |
| Aromatics | | 7.2 |
| Olefins | | 11.0 |
| Paraffins | 98.5 | 81.1 |
| Naphthenes | 1.5 | 0.7 |

[1] Wiese scale.

From the above examples it will be noted that one feature of the present invention is that a product of higher octane than the charge stock is obtained, yet there is no impairment of the TEL susceptibility which is usually associated with the conversion of paraffins to olefins.

Obviously many modifications and variations of the invention, as hereinbefore set forth, may be made without departing from the spirit and scope thereof, and therefore only such limitations should be imposed as are indicated in the appended claims.

We claim:

1. A method for improving the octane number of a hydrocarbon fraction having an initial boiling point not less than about 110° F. and an end point of about 350° F. and prepared by the alkylation of an isoparaffin with an olefin which comprises contacting said fraction with a dehydrogenation catalyst comprising a catalyst selected from the group consisting of oxides and sulfides of a group VI metal under dehydrogenation conditions including a temperature between 700 and 1200° F. at a liquid hourly space velocity of from 0.1 to 5 to produce a product of increased unsaturated hydrocarbon content having an improved octane number.

2. The method of claim 1 in which the catalyst comprises chromium oxide on alumina.

3. The method of claim 1 in which the catalyst comprises zinc oxide and zinc chromite.

4. The method of claim 1 in which the catalyst comprises a mixture of chromium oxide on alumina, zinc oxide and zinc chromite.

5. The method of claim 1 in which the catalyst comprises molybdenum sulfide.

6. The method of improving the octane number of a hydrocarbon fraction having an initial boiling point not less than about 110° F. and an end point of about 350° F. and prepared by the alkylation of an isoparaffin with an olefin which comprises contacting said fraction with a catalyst comprising chromium oxide on alumina under dehydrogenation conditions including a temperature between about 750 and 950° F. at a space velocity between 0.1 and 5 to produce a product of increased unsaturated hydrocarbon content having an improved octane number.

7. The method of improving the octane number of a hydrocarbon fraction having an initial boiling point not less than about 110° F. and an end point of about 350° F.

and prepared by the alkylation of an isoparaffin with an olefin which comprises contacting said hydrocarbon fraction with a catalyst comprising zinc oxide and zinc chromite under dehydrogenation conditions including a temperature between about 750 and 950° F. at a space velocity between 0.1 and 5 to produce a product of increased unsaturated hydrocarbon content having an improved octane number.

8. The process of claim 7 in which the catalyst contains between 25 and 75 percent by weight zinc oxide based on the combined weight of zinc oxide and zinc chromite.

9. The process of improving the octane number of a hydrocarbon fraction having an initial boiling point not less than about 110° F. and an end point of about 350° F. and prepared by the alkylation of an isoparaffin with an olefin which comprises contacting said hydrocarbon fraction with a catalyst comprising molybdenum sulfide under dehydrogenation conditions including a temperature between about 750 and 950° F. at a space velocity between 0.1 and 5 to produce a product of increased unsaturated hyrocarbon content having an improved octane number.

References Cited in the file of this patent

UNITED STATES PATENTS

| | | |
|---|---|---|
| 2,263,026 | Arveson | Nov. 18, 1941 |
| 2,265,641 | Grosskinsky et al. | Dec. 9, 1941 |
| 2,275,377 | Frey | Mar. 3, 1942 |
| 2,381,256 | Callaway | Aug. 7, 1945 |
| 2,404,050 | Gilbert | July 16, 1946 |
| 2,426,483 | Boucher et al. | Aug. 26, 1947 |